United States Patent [19]

Wilson et al.

[11] 4,262,776

[45] Apr. 21, 1981

[54] CONVEYOR LUBRICATING SYSTEM

[75] Inventors: Clark M. Wilson, Minneapolis; Robert B. Barrett, Lake Elmo, both of Minn.

[73] Assignee: H. B. Fuller Company, Saint Paul, Minn.

[21] Appl. No.: 941,971

[22] Filed: Sep. 13, 1978

[51] Int. Cl.³ .......................... G05D 11/08; B08B 9/08
[52] U.S. Cl. .................................... 184/15 R; 137/93; 198/500
[58] Field of Search .................. 184/15 R, 15 B, 6.24, 184/6.21; 198/500; 137/93, 88, 602, 5

[56] References Cited

U.S. PATENT DOCUMENTS

| 2,367,354 | 1/1945 | Kanter | 184/15 R X |
|---|---|---|---|
| 2,979,066 | 4/1961 | Christie | 137/93 X |
| 3,023,848 | 3/1962 | Osterman | 184/15 B |
| 3,148,747 | 9/1964 | Batchelor | 184/15 |
| 3,280,941 | 10/1966 | Fischer | 184/15 R X |
| 3,383,190 | 5/1968 | Weber et al. | 137/93 X |
| 4,015,618 | 4/1977 | Schmid | 137/93 |

Primary Examiner—David H. Brown
Attorney, Agent, or Firm—Merchant, Gould, Smith, Edell, Welter & Schmidt

[57] ABSTRACT

An improved conveyor lubricating system for applying a multi-ingredient lubricating composition to a conveyor. The system includes a holding tank which is operatively connected to a plurality of separate supply tanks where each of the ingredients of the composition are contained in a concentrated form. Pumping bodies are provided for separately pumping each of the concentrated ingredients into the holding tank in any desired ratio. Water is then added into the holding tank to dilute the concentrated ingredients and form the lubricating composition. A pump is provided for pumping the lubricating composition from the holding tank to the conveyor.

10 Claims, 3 Drawing Figures

CONVEYOR LUBRICATING SYSTEM

BACKGROUND OF THE INVENTION

1. Field of the Invention

This invention relates generally to lubrication systems. More particularly, this invention relates to a lubrication system which embodies a method and apparatus for applying a multi-ingredient lubricating composition to a conveyor.

2. Description of the Prior Art

Various types of conveyors are utilized in the bottling industry for moving bottles and cans from one point in a production line to another. These conveyors include various types of side flexing chain conveyors and the like. It is usually necessary that the conveyors be adequately lubricated. In this regard, a thin watery lubricating composition is customarily pumped or sprayed down onto the top flight of the conveyor. This lubricating composition drips down through the conveyor to also lubricate the return flight.

The lubricating compositions previously used in most lubricating systems accomplish more than simply lubricating the conveyor. For example, in the beer brewing industry, the growth of bacteria on the conveyor is a problem which plagues the art. It has been customary in the past that the lubricating composition sprayed onto the conveyor also include a bactericide for inhibiting bacteria growth. Similarly, the water supply in certain parts of the country (e.g., the Midwestern states) has a relatively high mineral content. When such a water supply is used in the lubricating composition, it tends to rust or otherwise degrade the conveying apparatus. Thus, the lubricating composition also desirably contains a water conditioner and/or rust inhibitor. Consequently, the lubricating composition which is conventionally sprayed onto the conveyors actually comprises a multi-ingredient composition.

One prior art conveyor lubricating system is known as the Monarch Crown Lube System which is used by the Monarch Chemicals Division of H. B. Fuller Company, the assignee of the present invention. In this system, a pump is provided for pumping a concentrate of the composition to a holding tank. This concentrate is then diluted with water to form the lubricating composition. The lubricating composition contained in the holding tank is then suitably applied to the conveyor. Operation of the pump for pumping the composition to the holding tank may be controlled by a conductivity sensor in the holding tank.

One problem with prior art conveyor lubricating systems such as those described above is that the lubricating composition concentrate has predetermined ratios of the ingredients therein. A single formulation of the concentrate is seldom effective for all conveyor plant operations. For example, a particular conveying application may have a serious bacteria growth problem. This might require that the composition being used in this application have a very high level of bactericide therein. This adjustment is made by increasing the amount of concentrate in the lubricating composition. However, because the ratio of the bactericide in any given concentrate is always fixed relative to the levels of the lubricant and/or the water conditioner, increasing the amount of the bactericide in the composition also increases the amount of lubricant being used and also the amount of water conditioner. Thus, the amount of lubricant being used may be increased to a point far in excess of that which is strictly necessary for the particular conveyor application. Since these other ingredients can be quite costly, the increase in concentration of those ingredients where an increase is not strictly necessary is an economic waste. Similarly, not all areas of the country require that a water conditioner be added in the composition (e.g., areas where the water supply has a low mineral content.) However, it is standard practice to include a water conditioner in the composition concentrate so that the same concentrate can be used in all areas of the country.

It is apparent that the prior practice of formulating a standard concentrate for creating the lubricating composition with the concentrate having pre-determined ratios of all the possibly needed ingredients is an economically wasteful practice. In an attempt to alleviate this waste, the prior art has provided a plurality of separate pre-formulated concentrates having varying ratios of the ingredients therein. The theory is to select the single concentrate from the group of concentrates which is most ideally suited to the conditions appearing at the particular conveying line. However, it is both difficult and expensive to pre-formulate and provide a range of totally separate concentrates. In addition, even with a number of pre-formulated concentrates to pick from, the prior art lubricating system lacks flexibility. For example, the conditions existing on any conveying line can change quite rapidly. For example, bacteria growth may all of a sudden increase to a point which requires that the lubricating composition have an increased level of bactericide. None of the present systems allows the operator much flexibility in adjusting the bactericide. Other than increasing the ratio of concentrate in the composition which increase applies equally to the water conditioner or to the lubricant thereby wasting these ingredients, all that the operator can do is switch from the particular concentrate he is using to another concentrate having a more favorable ratio of the ingredients. This however is very time-consuming.

SUMMARY OF THE INVENTION

One aspect of this invention is to provide a conveyor lubrication system which obviates the above-noted disadvantages by allowing the ingredients which comprise the lubricating composition to be supplied separately when formulating the composition.

More particularly, this invention comprises an improved lubricating system for use in applying a lubricating composition to a conveyor. The system includes means for supplying a concentrate of the composition to a holding tank. The holding tank includes means for adding water or another diluent thereto to dilute the concentrate to form the lubricating composition. A pump at the holding tank then pumps the lubricating composition to any suitable means for spraying or applying the composition to the conveyor. The present invention includes individual supply tanks in which a concentrate of each of the needed ingredients is held. Separate pumps are provided for separately conducting each of the ingredient concentrates to the holding tank. Thus, the level of any given ingredient in the final lubricating composition can be easily changed by varying the pumping ratios of the ingredient concentrate pumps.

BRIEF DESCRIPTION OF THE DRAWINGS

The present invention will be described in more detail hereafter in the Detailed Description, when taken in conjunction with the following drawings, in which like reference numerals refer to like elements throughout.

DETAILED DESCRIPTION

Figure 1:
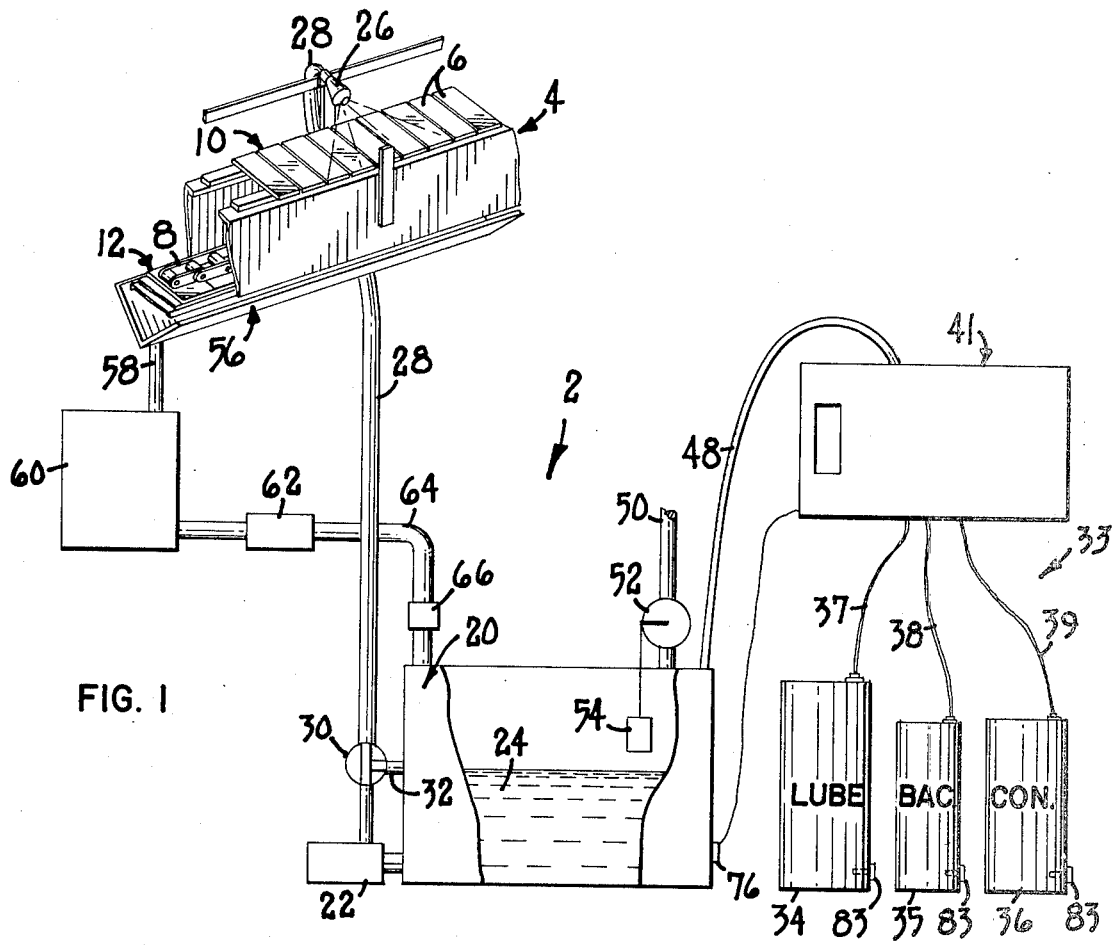
FIG. 1 is a schematic view of an improved conveyor lubricating system according to the present invention.

Referring first to FIG. 1, an improved lubrication system according to the present invention is generally illustrated as 2. Lubricating system 2 is particularly meant for use with a conveyor such as conveyor 4. Conveyor 4 may comprise any suitable conveyor which requires that a lubricating composition be applied thereto. As shown herein, conveyor 4 may be a chain type conveyor which is suited for conveying bottles and/or cans in the bottling industry. Conveyor 4 includes a plurality of article carrying slat members 6 pivotably connected to a chain 8. Conveyor 4 has a top flight 10 and a bottom return flight 12 located underneath top flight 10.

Lubricating system 2 includes a main holding tank generally designated herein as 20. A conventional motor driven pump 22 communicates with tank 20 near the bottom thereof. Pump 22 is for the purpose of drawing a lubricating composition 24 held in tank 20 from the tank 20 and for normally conducting that composition to conveyor 4. As shown in FIG. 1, the means for applying the lubricating composition to conveyor 4 includes any conventional spraying or other discharge means for simply conducting the composition onto the top flight 10 of conveyor 4. A plurality of spray nozzles 26 (one of which is shown in FIG. 1) are one preferred means for applying the lubricating composition 24 to top flight 10 of conveyor 4. Nozzles 26 are all connected by a supply conduit 28 to the discharge of pump 22. Conduit 28 includes a three-way valve 30. Valve 30 includes a second conduit 32 which extends between the valve 30 and the holding tank 20.

Lubricating system 2 further includes means for supplying a concentrate of the lubricating composition 24 to holding tank 20. This concentrate supplying means is generally indicated as 33 in FIG. 1. Most lubricating compositions 24 used in the bottling industry comprise a plurality of distinct components or ingredients in addition to a solvent or diluent. These ingredients generally include a suitable lubricant, a bactericide for inhibiting bacteria growth, and a water conditioner for treating where necessary the mineral content of the water supply normally used to formulate composition 24. The water conditioner in certain situations can also include a rust inhibitor. In any event, the concentrate of the lubricating composition which is supplied to tank 20 is usually from one or more of the concentrates of these three separate ingredients. As shown in FIG. 1, a first supply tank 34 is provided for holding a concentrate of a suitable lubricant or lubricating agent. A second supply tank 35 is provided for holding a concentrate of a suitable bactericide. And a third supply tank 36 is provided for holding a supply of a suitable water conditioning agent which might also include a rust inhibitor. While the present invention will be illustrated with regard to a system having three separate ingredients for forming the lubricating composition 24, any number of ingredients could be used where the lubricating composition 24 serves additional functions.

Figure 2:
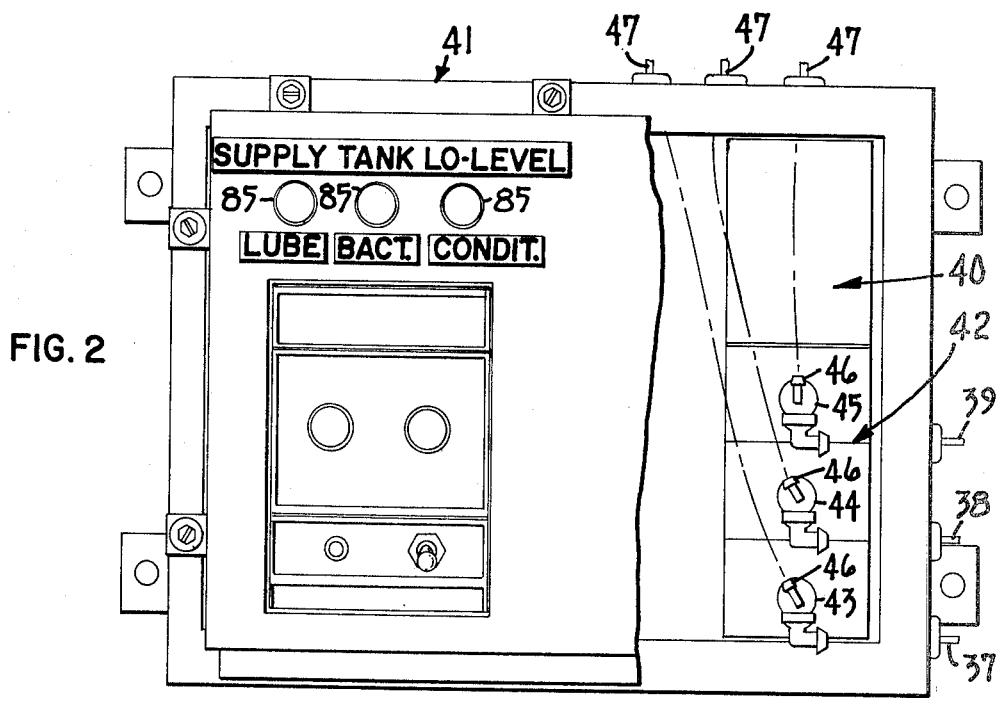
FIG. 2 is a side elevational view partly broken away, of a control means for use in the lubrication system shown in FIG. 1, particularly illustrating the pumping means for the concentrate supply tanks.

Each of the tanks 34–36 are respectively connected by fluid supply conduits 37–39 to a pumping means which is generally indicated as 40. Referring now to FIG. 2, pumping means 40 can comprise a portion of a control unit 41. Pumping means 40 preferably comprises a conventional tandem type pump 42 of the kind which is manufactured by Gorman-Rupp Industries, Div. of Bellville, Ohio. This type of pump has a plurality of pump units or bodies 43–45. Each pump body 43–45 is operatively connected to one of the fluid supply conduits 37–39. Pump bodies 43–45 are independently adjustable so that the amount of the concentrate being delivered by each pump body can be varied and precisely metered. Thus, the pump bodies 43–45 can deliver an adjustable ratio of the fluid concentrate ingredients contained in tanks 34–36. All three pump bodies 43–45 are driven by the same pump motor 80. See FIG. 3. The outputs 46 of the pump bodies 43–45 are connected by suitable conduits 47 into a single fluid supply conduit 48. Conduit 48 communicates with the top of holding tank 20 as shown in FIG. 1.

Holding tank 20 further includes a fluid supply conduit 50 at the top of tank 20. Conduit 50 is connected to a supply of a diluent for diluting the composition concentrate supplied to the tank 20 thereby forming the lubricating composition 24. Preferably, this diluent is ordinary tap water or the like. Supply conduit 50 has any conventional float type valve 52 connected therewith. Float valve 52 has a float 54 which floats on top of the liquid lubricating composition 24 contained in holding tank 20. Thus, fresh water can be admitted from conduit 50 into tank 20 whenever valve 52 is opened by float 54.

An upwardly opening trough, generally indicated as 56 in FIG. 1, underlies the return flights 12 of certain portions of conveyor 4. Trough 56 is connected by a fluid supply conduit 58 to an auxiliary holding tank 60. Trough 56 defines a means for recovering used lubricating composition (i.e., lubricating composition after it has been applied to conveyor 4). A pump 62 located near the outlet of tank 60 is able to pump the used lubricating composition held in tank 60 through a conduit 64 into holding tank 20. As the fluid is being returned to holding tank 20 along the return path defined by conduit 64, it passes through a suitable filter 66 in conduit 64. The purpose of filter 66 will be described in detail hereafter.

Figure 3:
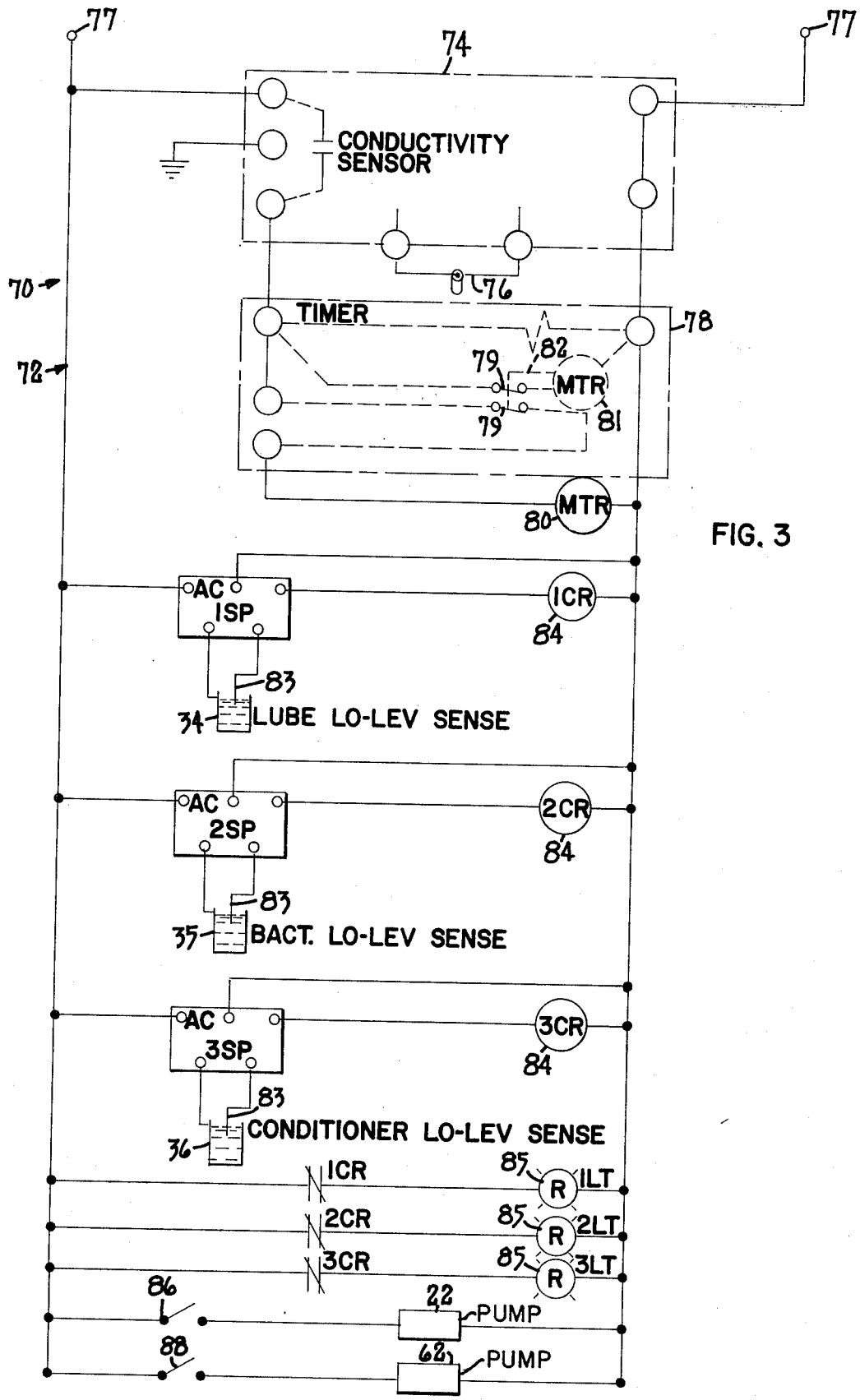
FIG. 3 is an electrical schematic view of a control circuit used with the control means shown in FIG. 2.

Referring now to FIGS. 2 and 3, a suitable control means generally indicated as 70 is provided for controlling the operation of pump 40. Control means 70 comprises an electrical circuit 72 which is built into control unit 41. Circuit 72 includes a conductivity sensor 74. Conductivity sensor 74 may be any conventional conductivity sensor, such as Beckman SGC-11 or SGD-1 control system. Conductivity sensor 74 serves to sense the conductivity of the lubricating composition 24 in the holding tank 20. In this regard, a microcell sensing unit 76 is physically located in tank 20 near the bottom thereof. When the conductivity of the lubricating composition 24 in tank 20 falls too low, the microcell 76 senses this condition and causes power to be fed from a power supply 77 through the conductivity sensor 74 to a timer 78.

Timer 78 is connected in series with the conductivity sensor 74. The timer includes two normally closed switches 79. When the switches 79 are closed, power is fed through the timer 78 to simultaneously activate the pump motor 80 for the pump 42 and an adjustable timer motor 81 inside timer 78. Timer motor 81 has a mechanical linkage 82 connected to the switches 79. When timer motor 81 times out, linkage 82 opens the switches 79. When pump motor 80 is activated, all three pump bodies 43-45 will also be activated to cause the ingredient concentrates in tanks 34-36 to be fed into the holding tank 20.

Electrical circuit 72 also includes a number of standard low-level sensors generally indicated as 83. One low-level sensor 83 is located respectively in each of the ingredient concentrate supply tanks 34-36. Whenever the level of the concentrate in a tank becomes too low, the sensor 83 causes power to be applied to a relay 84. Activation of the relay 84 lights an indicator light 85 corresponding to that relay. Indicator lights 85 are mounted on the front panel of the control unit 41. The indicator lights 85 respectively indicate that a low level condition of the ingredient concentrate is occurring in one of the tanks 34-36. An operator of system 2 can then suitably replenish the level of the ingredients in tanks 34-36. Circuit 72 also includes a first manually closable switch 86 connected to pump motor 22 for activation thereof. Similarly, a switch 88 may be connected to pump motor 62 for activation thereof.

With respect now to the operation of the conveyor lubricating system 2, it is apparent that the three components or ingredients which might be included in lubricating composition 24 can be separately and individually metered into holding tank 20. All that is required to accomplish such individual metering is for the pump volume ratio of the pump bodies 43-45 to be adjusted to a predetermined valve. Pump 42 is then operative to pump the three main ingredients or components of the liquid composition 24 in their concentrate form from the supply tanks 34-36 into the tank 20. Once these ingredients have been placed in tank 20, water may then be admitted into tank 20 through the conduit 50 and valve 52. This water dilutes the concentrated ingredients to form lubricating composition 24. When the supply tank 20 is substantially filled with the lubricating composition 24, the float 54 causes valve 52 to close.

Whenever pump 22 is energized, the main outlet valve of the pump (not shown) is continuously opened so that the liquid lubricating composition 24 held in the tank 20 is pumped into conduit 28. Valve 30 is in effect a bypass valve and is configured to recirculate a portion of the fluid passing through the conduit 28 into the conduit 32 and from there into the tank 20. Thus, during operation of the pump 22, at least some of the lubricating composition 24 being pumped through the conduit 28 is recirculated by the bypass valve 30 back into the tank 20. This configuration gives a continuous mixing action to the composition 24 held in the tank 20 to ensure uniform dilution of the components from the supply tanks 34-36.

Preferably, pump 22 continuously causes the lubricating composition 24 to be sprayed out through nozzles 26 onto conveyor 4. As the level of the lubricating composition 24 in tank 20 goes down, at some point the float 54 will activate or open float valve 52. With float valve 52 opened, additional water is brought into the tank 20 through conduit 50. This additional water when mixed with the remaining composition 24 in the tank 20 causes the concentration of the lubricant, bactericide, and water conditioning agents therein to decrease. This decreases the conductivity of composition 24 which activates the conductivity sensor 74. When the conductivity sensor 74 is activated, power is applied to the timer 78 to activate the pump motor 80. The pump bodies 43-45 then begin delivering additional amounts of the concentrated ingredients into the tank 20 for mixture with the incoming water from conduit 50. This operation ensures a continuous supply of the lubricating composition 24 in tank 20. It also ensures that the concentration of the active ingredients in composition 24 (i.e., the bactericide, lubricant, and water conditioner) remain within predetermined ranges.

Timer 78 accomplishes a safety or over-ride function. Specifically, when power is applied to the timer 78, power is also applied to timer motor 81. After a certain length of time depending on the adjustment of motor 81, timer motor 81 will time out. This causes linkage 82 to open the switches 79 through which power is being fed to the pump motor 80. Normally, this time sequence is sufficiently long such that the pump motor 80 will already have been deactivated by the conductivity sensor 74 which has opened in response to the rising conductivity level in tank 20 due to the amount of the active ingredients being added to composition 24. However, if for some reason the conductivity sensor 74 is inoperable causing a continuous energizing signal to be given to the pump motor 42, the timer 78 ensures that the ingredient concentrates will not be continuously pumped into holding tank 20 from the tanks 34-35. Thus, the ingredient concentrates will be pumped only for so long a period of time as the timer has not timed out and the conductivity sensor 74 is energized.

Trough 56 serves as a means for recovering and reusing used lubricating solution from the conveyor 4. Trough 56 is positioned beneath the return flight 12 to catch whatever of the lubricating composition 24 drips down through both the top and bottom flights 10 and 12 of the conveyor. Preferably, trough 56 is positioned only under cleaner sections of the conveyor 4, i.e. in sections of the conveyor where large amounts of dirt are not normally present on the conveyor or the articles being conveyed. The recovered composition 24 goes to tank 60. Pump 62 is activated upon demand by closing switch 88 to pump this lubricating composition 24 through the filter 66 and into tank 20. Filter 66 filters out the dirt or other contaminants present in the used lubricating composition 24.

Lubricating system 2 according to the present invention has a number of advantages. The primary advantage is that all the active ingredients or components of the liquid lubricating compostion 24 can be individually metered into holding tank 20. This allows an operator at the plant to achieve a precise degree of control over each of the ingredients normally needed in the lubricating composition 24. For example, an operator can determine (e.g., by visual inspection) that the level of the bactericide being used in the composition 24 is not high enough to adequately prevent bacteria growth. Then, by suitable adjustment of the pump body 44 relative to the other pump bodies 43 and 45, the amount of bactericide being pumped during operation of pump 42 can be increased relative to the amounts of the lubricant and the water conditioner. Thus, the lubricating composition 24 will then have an effectively increased level of bactericide without having to also simultaneously have increased levels of both the lubricant and the water conditioner. Consequently, economy may be achieved when operating system 2 since only the level of that ingredient of the coating composition 24 need to be increased when that particular ingredient is present in an insufficient amount. In addition, a great deal of flexibility is given to the operator of system 2. He can rapidly respond to changing conditions at the conveyor 4 simply by suitably readjusting the pump volume of pump bodies 43–45.

Although it is preferred that the ingredients of composition 24 be maintained in a concentrated form and then fed to a holding tank 20 where they are diluted to form the final lubricating composition 24, it would also be possible to supply the various components of the lubricating composition 24 in a diluted form. In this case, the components would merely be mixed together in holding tank 20. An important feature of the present invention is that all the components of the final lubricating composition can be individually metered. This can be accomplished whether the components are supplied in a concentrated or diluted form.

Various other modifications of this invention will be apparent to those skilled in the art. Thus, the scope of this invention is to be limited only by the appended claims.

We claim:

1. An improved lubricating system of the type which utilizes a lubricating composition formulated from a concentrate of the composition, wherein the concentrate may include one or more separate concentrate ingredients therein; and wherein the lubricating system includes a holding tank; means operatively connected to the holding tank for supplying the composition concentrate thereto, wherein the holding tank has means for diluting the concentrate supplied thereto forming the lubricating composition; and means operatively connected to the holding tank for applying the lubricating composition to the conveyor; and wherein the improvement relates to the composition concentrate supplying means and comprises:
means for separately supplying each of the concentrate ingredients to the holding tank such that the amount of each ingredient contained in the lubricating composition can be separately controlled, wherein the concentrate ingredient supplying means includes a source of each of the ingredients and selectively adjustable pumping means for pumping each of the ingredients from its source to the holding tank to volitionally vary the amount of each ingredient being pumped to the holding tank.

2. An improved conveyor lubricating system of the type which utilizes a lubricating composition formulated from a concentrate of the composition, wherein the concentrate may include one or more separate concentrate ingredients therein; and wherein the lubricating system includes a holding tank; means operatively connected to the holding tank for supplying the composition concentrate thereto, wherein the holding tank has means for diluting the concentrate supplied thereto forming the lubricating composition; and means operatively connected to the holding tank for applying the lubricating composition to the conveyor; and wherein the improvement relates to the composition concentrate supplying means and comprises:
means for separately supplying each of the concentrate ingredients to the holding tank such that the amount of each ingredient contained in the lubricating composition can be separately controlled, wherein the concentrate ingredient supplying means comprises:
(a) a separate supply tank for containing each of the concentrate ingredients;
(b) means for independently pumping each of the concentrate ingredients from their respective supply tanks to the holding tank; and
(c) wherein the pumping means is adjustable to selectively vary the amount of each ingredient being pumped from each supply tank to the holding tank.

3. An improved conveyor lubricating system as recited in claim 2, wherein the pumping means comprises a separate pump operatively connected to each of the supply tanks for the concentrate ingredients, and wherein each pump has means for adjusting the pump volume thereof so that the amount of the ingredient being pumped by the pump is adjustable.

4. An improved conveyor lubricating system as recited in claim 2, wherein each of the supply tanks has means for indicating a low level of the concentrate ingredient therein.

5. An improved conveyor lubricating system as recited in claim 2, further including means for controlling the operation of the concentrate ingredient supplying means in response to the amount of the concentrate in the lubricating composition.

6. An improved conveyor lubricating system as recited in claim 5, wherein the control means comprises:
(a) an electrical circuit for operatively energizing the concentrate ingredient supplying means, and
(b) means for sensing the conductivity of the lubricating composition in the holding tank, the conductivity sensing means being operatively connected in the circuit to activate the concentrate ingredient supplying means whenever the conductivity of the lubricating composition in the holding tank falls below a predetermined level.

7. An improved conveyor lubricating system as recited in claim 2, further including means for mixing the lubricating composition held in the holding tank to ensure uniform dilution of the concentrate.

8. An improved lubricating system as recited in claim 7, in which the mixing means includes means for withdrawing the lubricating composition from the holding tank and for recirculating at least a portion of the composition back to the holding tank.

9. An improved conveyor lubricating system as recited in claim 2, further including means for recovering used lubricating composition from the conveyor, and wherein the recovering means is operatively connected along a return path to the holding tank for returning the used lubricating composition to the holding tank for reuse.

10. An improved conveyor lubricating system as recited in claim 9, further including a filter located in the return path for filtering contaminants from the used lubricating composition.

* * * * *